UNITED STATES PATENT OFFICE.

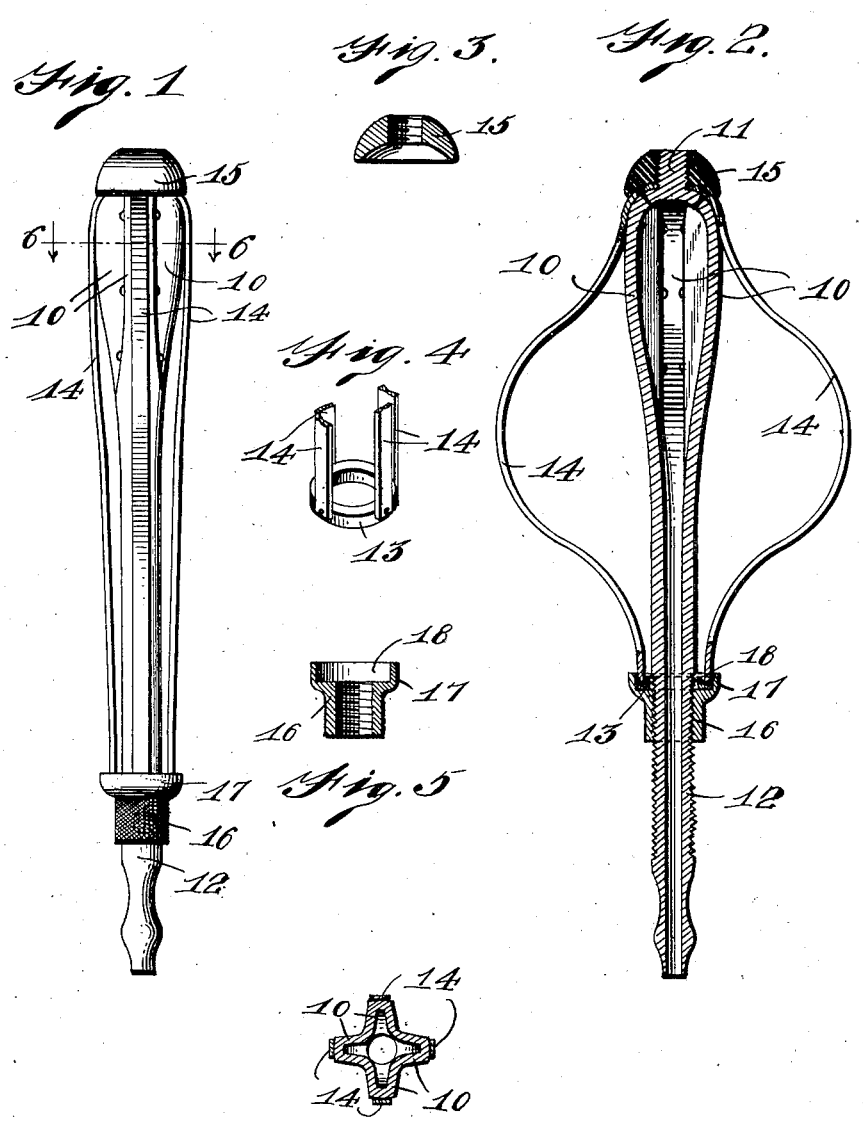

ISAAC W. KURTZ AND JOSEPH W. RANKIN, OF PERU, INDIANA.

VAGINAL SYRINGE.

1,073,249.  Specification of Letters Patent.  Patented Sept. 16, 1913.

Application filed July 17, 1912. Serial No. 709,963.

*To all whom it may concern:*

Be it known that we, ISAAC W. KURTZ and JOSEPH W. RANKIN, citizens of the United States of America, residing at Peru, in the county of Miami and State of Indiana, have invented certain new and useful Improvements in Vaginal Syringes, of which the following is a specification, reference being had therein to the accompanying drawing.

This invention relates to syringes and more especially to vaginal syringes provided with means for dilating the vagina.

The principal object of the invention is to provide an improved form of dilater attachment for a vaginal syringe.

With the above and other objects in view, as will be hereinafter apparent, the invention consists in general in certain details of construction and combinations of parts described and claimed in the annexed specification.

In the drawings, Figure 1 is a side elevation of the syringe with the dilater collapsed. Fig. 2 is a section showing the dilater expanded. Fig. 3 is a vertical section of the protecting cap of the device. Fig. 4 is a detail view of the movable ring and connecting end of the springs. Fig. 5 is a vertical section of a nut employed. Fig. 6 is a section on the line 6—6 in Fig. 1.

The invention resides principally in the discharge tube or nozzle of the syringe and consists of a body 10 of an elongated pear shape and having a threaded boss 11 at its upper end and being provided with a threaded shank or stem 12. In cross section the body is star-shaped as shown in Fig. 6. Slidable on the body is a ring 13 to which are attached the lower ends of a series of thin steel springs 14. The other ends of these springs are attached to the upper end of the body 10 adjacent the boss 11 and on this boss is screwed a protecting cap 15 which covers the ends of the springs and prevents injury when inserting the syringe. On the threaded stem 12 is screwed a knurled nut 16 having the enlarged end 17 to provide a recess 18 adapted to receive the ring 13.

In operation the device is entered in the position shown in Fig. 1 and when in position, the knurled nut is rotated. This causes the springs to bow outwardly and dilates the vagina.

What is claimed is:—

In a device of the character described, a hollow body, a sleeve adjustable lengthwise on said body and having its upper portion enlarged and spaced from said body, a ring loose in said space, a threaded projection on the inner end of said body, radial outwardly curved projections extending along the upper part of said body and having cross apertures therein connecting with the bore of said body, normally straight outwardly curvable springs having their inner ends secured on said projections and their outer ends secured to said ring in the annular space of said sleeve, and a cap threaded on the projection at the inner end of said body, as specified.

In testimony whereof we hereunto affix our signatures in presence of two witnesses.

ISAAC W. KURTZ.
JOSEPH W. RANKIN.

Witnesses:
 LOUIS E. WHITE,
 EDGAR P. KLING.